US011095051B2

(12) United States Patent
Dai (10) Patent No.: US 11,095,051 B2
(45) Date of Patent: Aug. 17, 2021

(54) CLAMP WITH A CONDUCTIVE BRIDGE MECHANISM

(71) Applicant: Alex Dai, Taichung (TW)

(72) Inventor: Alex Dai, Taichung (TW)

( * ) Notice: Subject to any disclaimer, the term of this patent is extended or adjusted under 35 U.S.C. 154(b) by 0 days.

(21) Appl. No.: 16/768,522

(22) PCT Filed: Dec. 12, 2017

(86) PCT No.: PCT/CN2017/115535
§ 371 (c)(1),
(2) Date: May 29, 2020

(87) PCT Pub. No.: WO2019/113762
PCT Pub. Date: Jun. 20, 2019

(65) Prior Publication Data
US 2020/0388939 A1 Dec. 10, 2020

(51) Int. Cl.
*H01R 4/48* (2006.01)
*H02H 7/18* (2006.01)
(52) U.S. Cl.
CPC ............... *H01R 4/48* (2013.01); *H02H 7/18* (2013.01)
(58) Field of Classification Search
CPC ... H01R 4/48; H01R 4/38; H01R 4/28; H02H 7/18
USPC .......................................................... 439/759
See application file for complete search history.

(56) References Cited

U.S. PATENT DOCUMENTS

| 4,929,199 A * | 5/1990 | McKinnon | H01R 11/24 439/437 |
| 5,002,508 A * | 3/1991 | Craveiro | H01R 11/24 439/755 |
| 5,011,437 A * | 4/1991 | Gibbons | H01R 11/24 439/759 |
| 6,140,796 A | 10/2000 | Martin et al. | |

(Continued)

FOREIGN PATENT DOCUMENTS

| CN | 204559193 U | 8/2015 |
| CN | 204835626 U | 12/2015 |

(Continued)

*Primary Examiner* — Harshad C Patel
(74) *Attorney, Agent, or Firm* — Muncy, Geissler, Olds & Lowe, P.C.

(57) ABSTRACT

A clamp is provided, including: the first clamp body, provided with a first jaw; a conductive bridge mechanism, for electrically connecting to an electrode and comprising a reciprocating assembly, an elastic engaging element, and an operable portion. The elastic engaging element is provided between the reciprocating assembly and the operable portion and is independent and separated from the reciprocating assembly. The elastic engaging element can be operated to move towards the reciprocating assembly. The reciprocating assembly can be mutually engaged and positioned with the elastic engaging element. When the elastic engaging element is positioned at a third position, the reciprocating assembly can be engaged by the elastic engaging element and thus be positioned at a second position so as to allow the first jaw to be electrically connected to the electrode; when the elastic engaging element is operated and positioned at a fourth position, the reciprocating element is not stopped by the elastic engaging element and can thus be automatically positioned at the first position and not electrically connected to the first jaw.

10 Claims, 7 Drawing Sheets

(56) References Cited

U.S. PATENT DOCUMENTS

| | | | | |
|---|---|---|---|---|
| 6,364,719 | B1* | 4/2002 | Chopra | H01R 11/282 |
| | | | | 439/759 |
| 6,871,387 | B2* | 3/2005 | Cheng | H01R 11/24 |
| | | | | 24/499 |
| 7,666,024 | B2* | 2/2010 | De France | H01R 11/15 |
| | | | | 439/479 |
| 2009/0247020 | A1* | 10/2009 | Gathman | H01R 11/24 |
| | | | | 439/759 |
| 2010/0221961 | A1* | 9/2010 | Jensen | H01R 11/24 |
| | | | | 439/759 |
| 2015/0377275 | A1* | 12/2015 | De France | F16B 31/028 |
| | | | | 411/10 |
| 2016/0036137 | A1* | 2/2016 | Aponte | H01R 4/48 |
| | | | | 439/372 |

FOREIGN PATENT DOCUMENTS

| | | |
|---|---|---|
| CN | 206313482 U | 7/2017 |
| CN | 206340693 U | 7/2017 |

* cited by examiner

CLAMP WITH A CONDUCTIVE BRIDGE MECHANISM

BACKGROUND OF THE INVENTION

Field of the Invention

The present invention relates to a clamp.

Description of the Prior Art

Generally, automobiles and motorcycles are difficult to start when it is in low battery. The battery is usually electrically connected with a battery of a rescue device or a battery of another vehicle through a positive rescue line and a negative rescue line, so as to charge the battery to be sufficient to start the automobiles or the motorcycles.

The positive rescue line and the negative rescue line are often reversely electrically connected with the battery of the rescue device or the battery of another vehicle in insufficient lighting environment or uncarefully. The conventional electrical clamp has no safety mechanism for avoiding wrong pole-connection to the battery, and thus it is easy to cause damage to the battery of the rescue device or the battery of another vehicle and to the electrical products (such as computer, audio, etc.) of the automobiles or the motorcycles.

The present invention is, therefore, arisen to obviate or at least mitigate the above-mentioned disadvantages.

SUMMARY OF THE INVENTION

The main object of the present invention is to provide a clamp which is capable of avoiding wrong pole-connection to a battery, and with a simple structure and low cost.

To achieve the above and other objects, the present invention provides a clamp, including a first clamp body, having a first jaw which is electrically conductive; a second clamp bod, pivoted with the first clamp body and having a second jaw being pivotable relative to the first jaw; a first elastic member, two ends of the first elastic member abutted respectively against the first clamp body and the second clamp body so that the first jaw of the first clamp body and the second jaw of the second clamp body are biased toward each other; and a conductive bridge mechanism, configured to be electrically connected with an electrode, including a reciprocating assembly, an elastic engaging element and an operable portion, the elastic engaging element disposed between the reciprocating assembly and operable portion, the elastic engaging element and the reciprocating assembly being individually separate members, the elastic engaging element being movable toward the reciprocating assembly, the reciprocating assembly being movable toward the elastic engaging element and being positionally engaged with the elastic engaging element through an elastic reverse movement of the elastic engaging element, the reciprocating assembly having a first end corresponding to the first jaw and a second end corresponding to the elastic engaging element, the reciprocating assembly being movable between a first position and a second position, the elastic engaging element being movable between a third position and a fourth position, the operable portion being movable between a fifth position and a sixth position; wherein when the operable portion is located in the fifth position and the elastic engaging element is located in the third position, the reciprocating assembly is blocked by the elastic engaging element and located in the second position, and the electrode are electrically connected via the reciprocating assembly; when the elastic engaging element is located in the fourth position, the reciprocating assembly is not blocked by the elastic engaging element and biased to the first position, and the first jaw and the electrode are not electrically connected.

The present invention will become more obvious from the following description when taken in connection with the accompanying drawings, which show, for purpose of illustrations only, the preferred embodiment(s) in accordance with the present invention.

REFERENCE NUMERALS

1: clamp; 10: first clamp body; 11: first jaw; 12: main body; 20: second clamp body; 30: first elastic member; 40: conductive bridge mechanism; 41: reciprocating assembly; 42: elastic engaging element; 43: operable portion; 44: electric conductor; 47: pivoting member; 60: retaining rod; 70: n-shaped member

DETAILED DESCRIPTION OF THE PREFERRED EMBODIMENTS

Please refer to FIGS. 1 to 5 and FIGS. 5A-5C for a first preferable embodiment of the present invention. A clamp 1 of the present invention includes a first clamp body 10, a second clamp body 20, a first elastic member 30 and a conductive bridge mechanism 40.

A front end of the first clamp body 10 has a first jaw 11 which is electrically conductive. The first clamp body 10 includes a main body 12 which is elongated, the main body 12 may be entirely made of plastic material or may include a metal main body and an electrically insulated sleeve coating on an outer surface of the metal main body. A front end of the main body 12 has the first jaw 11.

The second clamp body 20 is pivoted with the first clamp body 10. The second clamp body 20 has a second jaw 21 being pivotable relative to the first jaw 11 and a grip portion being pivotable relative to a grip portion of the first clamp body 10. The second clamp body 20 may be a conductor or a nonconductor. Specifically, the second clamp body 20 is pivoted with the first clamp body 10 to form an X-shaped configuration.

Two ends of the first elastic member 30 are abutted respectively against the first clamp body 10 and the second clamp body 20 so that the first jaw 11 of the first clamp body 10 and the second jaw 21 of the second clamp body 20 are biased toward each other. Specifically, the first elastic member 30 is a torsion spring, but not limited thereto. The first elastic member 30 is sleeved on a pivot rod with which the first clamp body 10 and the second clamp body 20 are pivotally connected. The torsion spring biases the grip portion of the first clamp body 10 and the grip portion of the second clamp body 20. After pressing the grip portion of the first clamp body 10 and the grip portion of the second clamp body 20 to drive the first jaw 11 away from the second jaw 21, the grip portion of the first clamp body 10 and the grip portion of the second clamp body 20 can be elastically returned. The first jaw 11 of the first clamp body 10 and the second jaw 21 of the second clamp body 20 can clamp an object such as an electrode post of a battery.

The conductive bridge mechanism 40 is configured to be electrically connected with an electrode, for example, a rescue battery or a positive or negative electrode of any type of power supply. The conductive bridge mechanism 40 includes a reciprocating assembly 41, an elastic engaging element 42 and an operable portion 43. In this embodiment, the operable portion 43 is the grip portion of the first clamp body 10. The elastic engaging element 42 is disposed between the reciprocating assembly 41 and the operable portion 43. The elastic engaging element 42 and the reciprocating assembly 41 are individually separate members.

Specifically, the elastic engaging element 42 is movable toward the reciprocating assembly 41, and the reciprocating assembly 41 is movable toward the elastic engaging element 42 and is positionally engaged with the elastic engaging element 42 through an elastic reverse movement of the elastic engaging element 42. The reciprocating assembly 41 has a first end corresponding to the first jaw 11 and a second end corresponding to the elastic engaging element 42. The reciprocating assembly 41 is movable between a first position and a second position, the elastic engaging element 42 is movable between a third position and a fourth position. In this embodiment, the third position and the fourth position are located in a longitudinal direction of the first clamp body 10, and the operable portion 43 is movable between a fifth position and a sixth position.

The reciprocating assembly 41 includes a movable member 45 disposed through the first clamp body 10, a bridge member 46, a pivoting member 47 pivoted with the first clamp body 10 and pivoted with the movable member 45 at one end, and a second elastic member 48 disposed between the bridge member 46 and the first clamp body 10. In addition, the bridge member 46 is coated with an electrical insulating layer 464, when the bridge member 46 is disposed through the movable member 45, and the electrical insulating layer 464 is disposed between the bridge member 46 and movable member 45, so as to prevent the bridge member 46 and the movable member 45 from conducting to each other.

In this embodiment, the bridge member 46 is configured to be electrically connected with the electrode, the first clamp body 10 includes an electric conductor 44 which is configured to be electrically connected with the electrode, the electric conductor 44 is disposed on the first jaw 11 and electrically insulated from the first jaw 11 (as the main body 12 is made of electrically conductive material, there is an insulating layer disposed between the electric conductor 44 and the main body 12), the bridge member 46 is electrically connectable with the electric conductor 44 via the reciprocating assembly 41. Furthermore, the electric conductor 44 has a first electric contact surface 441, and the bridge member 46 has a second electric contact surface 463 facing the first electric contact surface 441. When the operable portion 43 is located in the fifth position and the elastic engaging element 42 is located in the third position, the second electric contact surface 463 electrically contacts the first electric contact surface 441.

In this embodiment, the bridge member 46 includes a first abutting section 461 and a second abutting section 462, the first abutting section 461 and the second abutting section 462 are angularly arranged, the second abutting section 462 abuts against and is electrically insulated from the first clamp body 10 (as the main body 12 is made of the conductive material, a first insulating layer 92 is further disposed between the second abutting section 462 and the main body 12), the first abutting section 461 is normally separated from the electric conductor 44, and the first abutting section 461 is disposed through the movable member 45 and electrically contactable with the electric conductor 44 via the reciprocating assembly 41. The movable member 45 has at least one ear portion 452, the at least one ear portion 452 is pivoted with the pivoting member 47. In this embodiment, there are two of said ear portions 452 which are respectively pivoted with opposite sides of the pivoting member 47, and the movable member 45 can be stably moved by the pivoting member 47.

The pivoting member 47 has a first engaging portion 471 extending toward the elastic engaging element 42. The elastic engaging element 42 has a second engaging portion 421 extending toward the pivoting member 47. One of the first engaging portion 471 and the second engaging portion 421 has at least one male engaging structure, and the other of the first engaging portion 471 and the second engaging portion 421 has at least one female engaging structure engageable with the at least one male engaging structure. In this embodiment, the first engaging portion 471 has a plurality of said male engaging structures which are hooks. The second engaging portion 421 has a plurality of said female engaging structures which are holes hooked by the plurality of said male engaging structures. In other embodiments, each female engaging structure may be a protruding structure hooking one of said male engaging structures.

The elastic engaging element 42 has an elastic pressing section 422. The second engaging portion 421 is connected with the elastic pressing section 422. Specifically, one end of the elastic engaging element 42 is disposed parallelly on the first clamp body 10. The elastic pressing section 422 is substantially n-shaped. The elastic pressing section 422 and the first clamp body 10 form a compression space 50 therebetween. When the elastic pressing section 422 is pressed, the elastic pressing section 422 is deformed and depressed toward the compression space 50 so that the second engaging portion 421 is movable between the third position and the fourth position. After the elastic pressing section 422 is released, the second engaging portion 421 can be reversely elastically returned.

Besides, the elastic engaging element 42 has a first elongated hole 423. The first elongated hole 423 extends toward a connection direction. The third position and the fourth position are located in the connection direction. The first elongated hole 423 and the first clamp body 10 are disposed through a retaining rod 60, and the elastic engaging element 42 is blocked by the retaining rod 60 so that only can be movable between the third position and the fourth position. The clamp 1 includes an n-shaped member 70. The n-shaped member 70 is assembled to the first clamp body 10 and has two restricting legs 71 respectively arranged on opposite two sides of the elastic engaging element 42, and two limiting legs 71 are arranged transversely to the connection direction. Preferably, the n-shaped member 70 has a second elongated hole 72 which transversely extends to the first elongated hole 423, the retaining rod 60 is disposed through the second elongated hole 72 so that the elastic engaging element 42 can be stably moved and is not easy to skew.

Moreover, a third elastic member 80 is disposed between the operable portion 43 and the elastic engaging element 42, and the third elastic member 80 biases the operable portion 43 to move toward the fifth position.

The conductive bridge mechanism 40 includes a conductive wire 49. The conductive wire 49 has two opposite ends which are respectively electrically connected with two opposite ends of the bridge member 46. When current flows through the conductive wire 49 and the bridge member 46, a current density of the conductive wire 49 is greater than a current density of the bridge member 46. The conductive wire 49 is woven by a plurality of metal thin wires. In this embodiment, the metal wires are metal copper wires, and it is more suitable for a large-sized battery of a vehicle such as a yacht or a truck.

Figure 1:
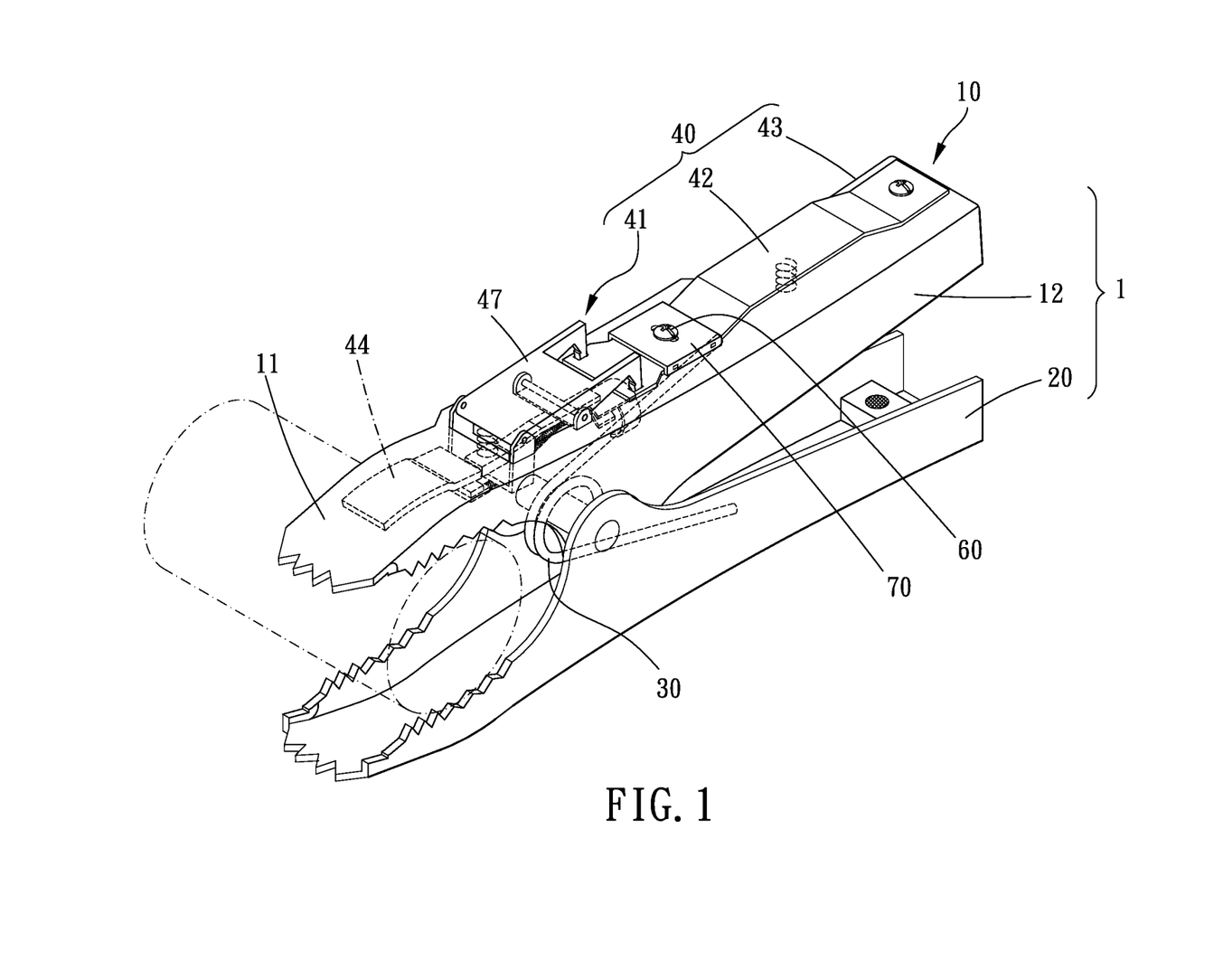
FIG. 1 is a stereogram of a first preferable embodiment of the present invention.
Figure 2:
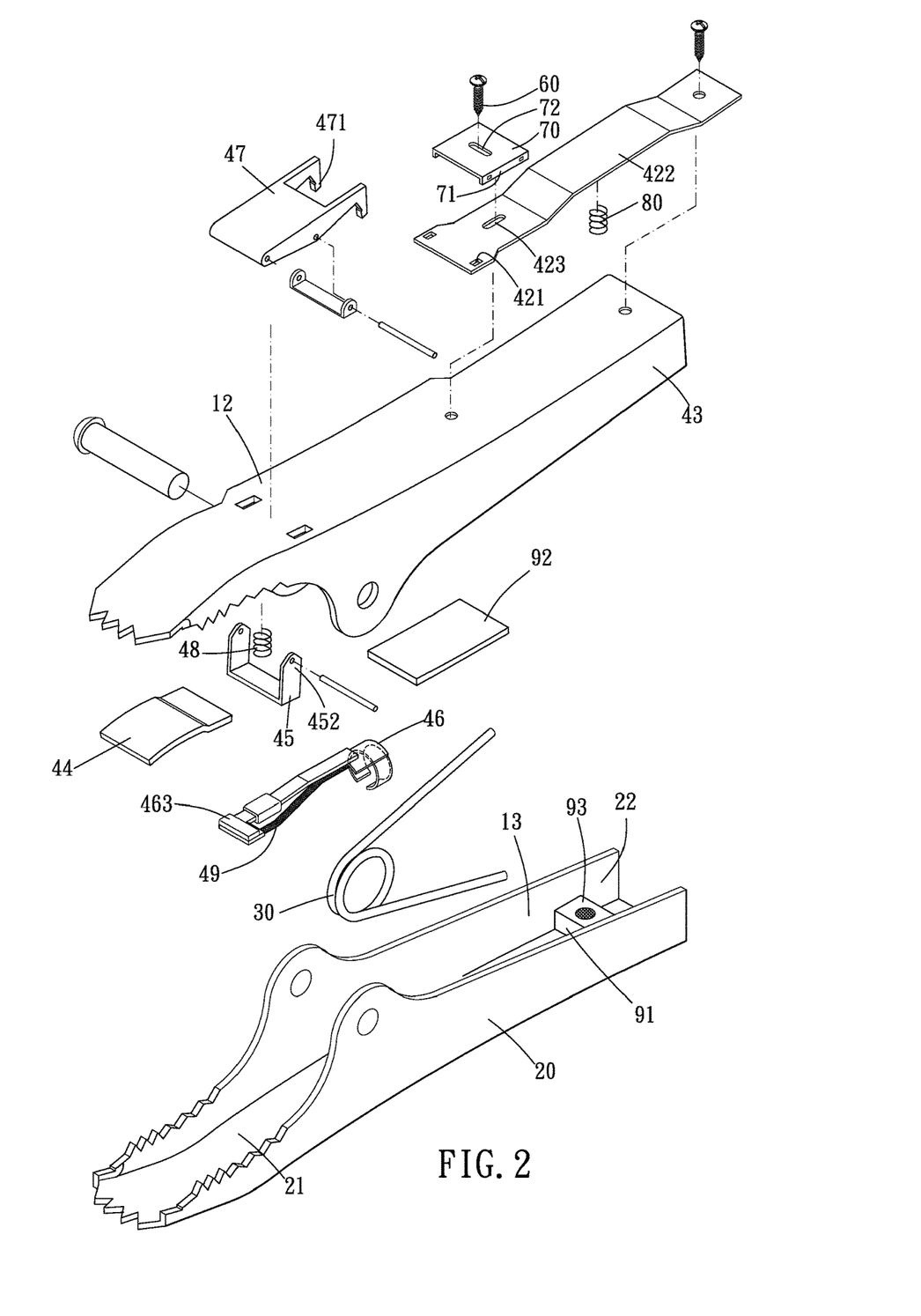
FIG. 2 is a breakdown drawing of the first preferable embodiment of the present invention.
Figure 3:
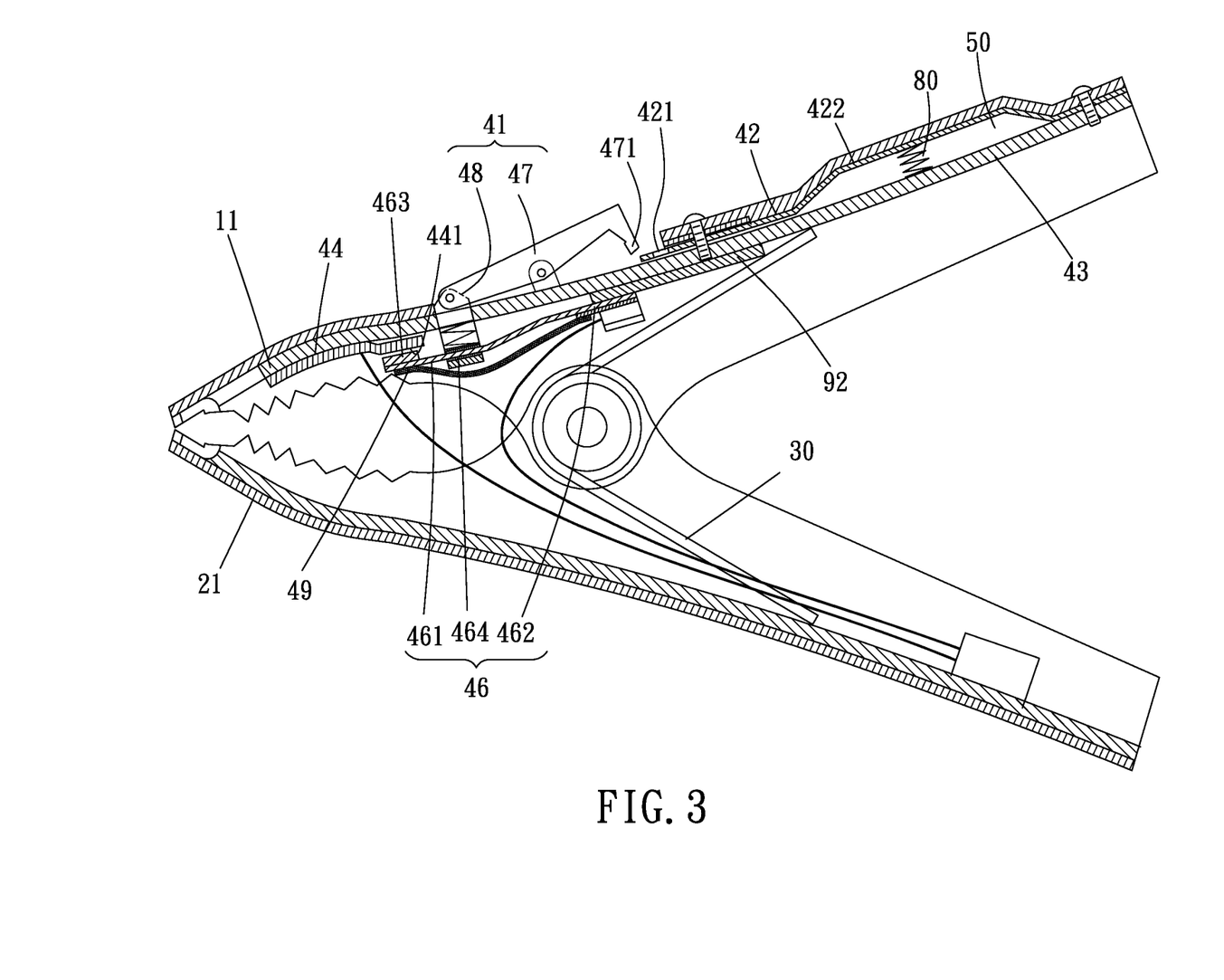
FIGS. 3 to 4 are cross-sectional drawings of the first preferable embodiment of the present invention.
Figure 4:
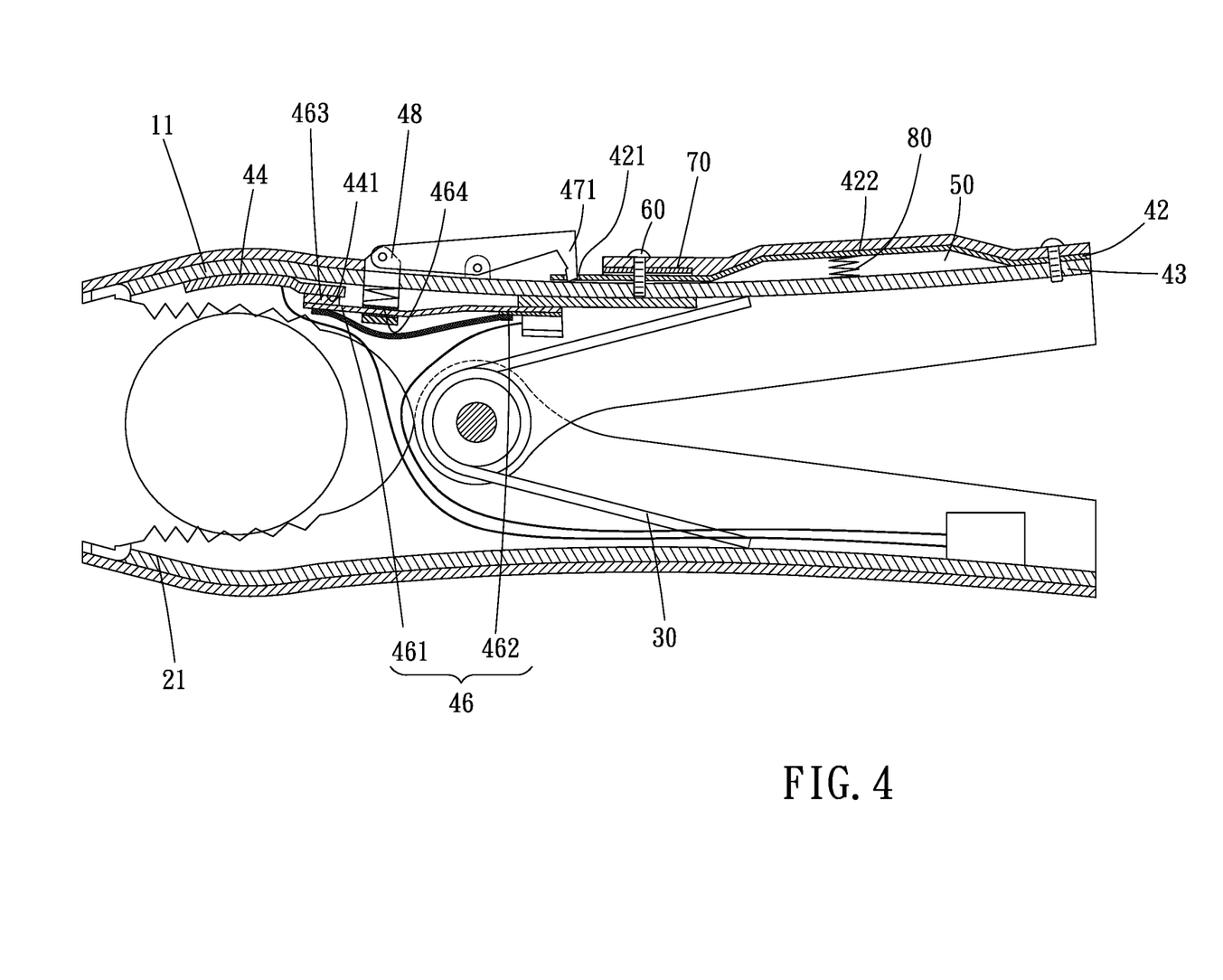

In operation, when the operable portion 43 is located in the fifth position and the elastic engaging element 42 is located in the third position, another end of the pivoting member 47 is blocked by the elastic engaging element 42 so that the reciprocating assembly 41 is located in the second position, the electrode is electrically connected via the reciprocating assembly 41 (as shown in FIG. 4). When the operable portion 43 is located in the sixth position, the elastic engaging element 42 is located in the fourth position, the reciprocating assembly 41 is not blocked by the elastic engaging element 42 and biased to the first position. More specifically, the second elastic member 48 biases the bridge member 46 to move away from the first jaw 11 to drive the another end of the pivoting member 47 away from the elastic engaging element 42 so that the pivoting member 47 is not blocked by the elastic engaging element 42 and so that the bridge member 46 is electrically disconnected from the first jaw 11 (as shown in FIG. 3). Specifically, when the operable portion 43 is located in the fifth position and the elastic engaging element 42 is located in the third position, another end of the pivoting member 47 is blocked by the elastic engaging element 42 so that the reciprocating assembly 41 is located in the second position, and the bridge member 46 is electrically connected with the electric conductor 44 so that the electrode is conducted from the electric conductor 44 to the bridge member 46, and further to an article such as a battery electrode post. More specifically, when the operable portion 43 is located in the fifth position and the elastic engaging element 42 is located in the third position, the second electric contact surface 463 electrically contacts the first electric contact surface 441, so as to provide a larger electrical contact area. As a result, power consumption can be reduced and power output can be increased. When the operable portion 43 is located in the sixth position, the second elastic member 48 biases the bridge member 46 to move each female engaging structure to disengage from one of the male engaging structure of the elastic engaging element 42, and another end of the pivoting member 47 is not blocked by the elastic engaging element 42 and is released from the elastic engaging element 42, and the bridge member 46 is driven to move away from the electric conductor 44 so that the bridge member 46 is electrically disconnected from the electric conductor 44. Additionally, the third elastic member 80 biases the operable portion 43 to move toward the fifth position. It is to be noted that when the clamp 1 is pressed, the operable portion 43 is pressed to be in the fifth position, the bridge member 46 is kept electrically disconnected from the electric conductor 44, thus preventing the battery from damage due to wrong pole-connection.

The clamp 1 includes a first joint portion 13 which may be disposed on the first clamp body 10 or the second clamp body 20. An alarm device 90 is connected with the first joint portion 13 by a second joint portion 91. The first joint portion 13 and the second joint portion 91 correspond to each other in structure and in shape. The alarm device 90 is electrically connected, in series, with and between the first jaw 11 of the main body 12 and the conductive bridge mechanism 40, and the alarm device 90 is electrically connected with the electrode. Specifically, the alarm device 90 is electrically connected, in series, with and between the electric conductor 44 of the main body 12 and the bridge member 46. One of the first joint portion 13 and the second joint portion 91 is a recess, the other of the first joint portion 13 and the second joint portion 91 is a convex portion disposed within the recess. The alarm device 90 includes at least one of audible alarm and a light alarm. In this embodiment, the alarm device 90 is a buzzer 93, and the first joint portion 13 is a recess 22 disposed on the second clamp body 20. The second joint portion 91 is a shell of the alarm device 90 corresponding to the recess 22. The first joint portion 13 may be connected with the second joint portion 91 by bonding, locking, screwing, etc. In other embodiment, the alarm device includes two light emitting diodes. The first joint portion includes two openings which are disposed on two sides of the main body, each of two external packaging materials of the two light emitting diodes serves as the second joint portion, the two external packaging materials of the two light emitting diodes of the alarm device can be positionally engaged within one of the two openings, thus being easy to disassemble.

Figure 5:
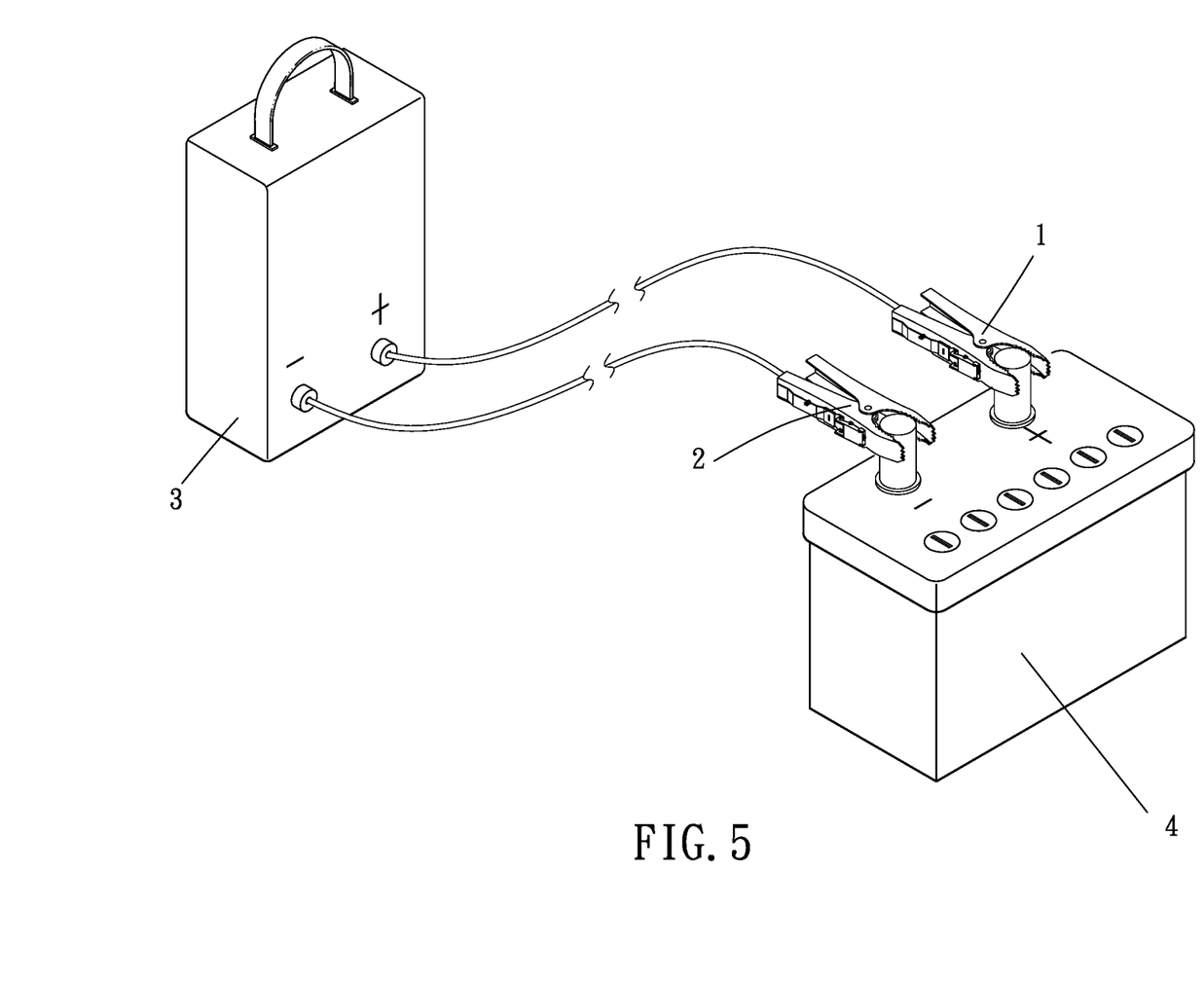
FIG. 5 is a schematic diagram of the first preferable embodiment of the present invention in use.
Figure 5A:
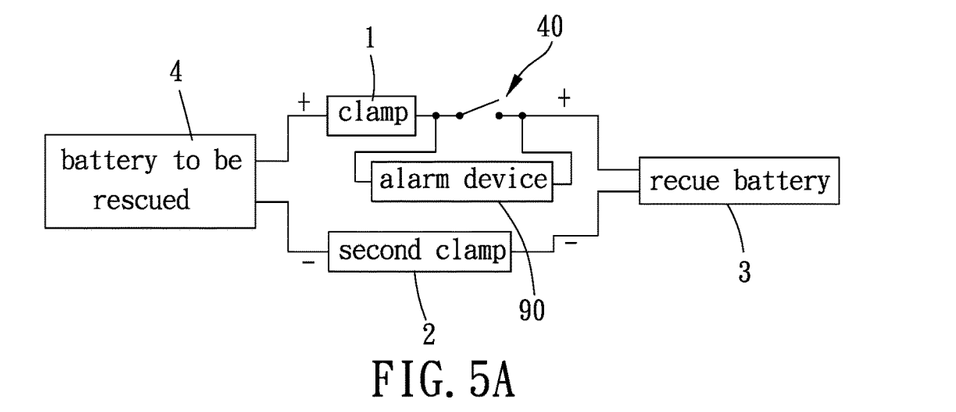
FIGS. 5A to 5C are schematic diagrams showing a circuit structure during operation of the first preferable embodiment of the present invention.
Figure 5B:
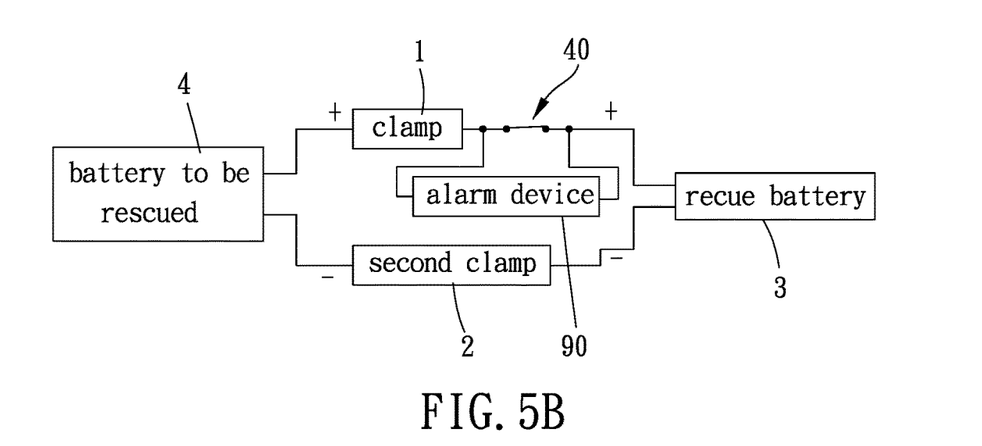
Figure 5C:
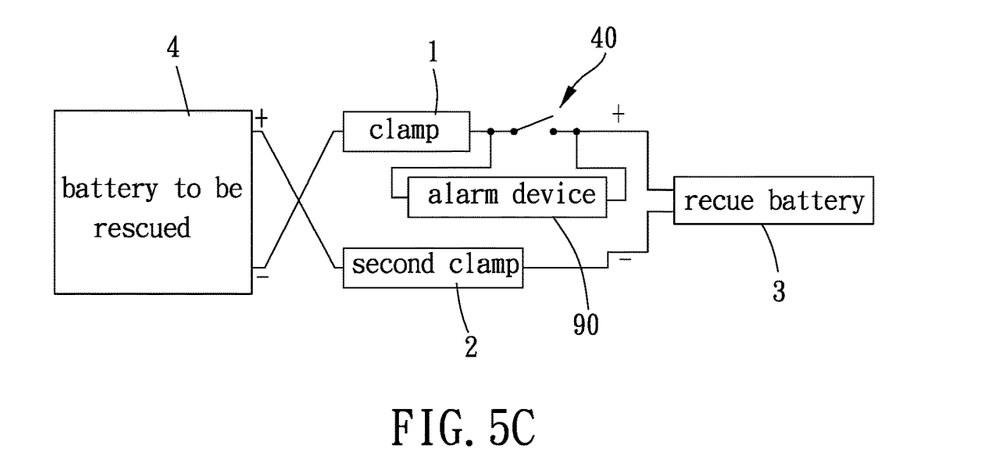

The following is an example of a rescue program. Please further refer to FIGS. 5, 5A, 5B and 5C. In a rescue procedure, the clamp 1 of the invention is used with another second clamp 2. The electric conductor 44 and the second clamp 2 are respectively electrically connected with a positive pole and a negative pole of a rescue battery 3 via conductive wires. Before a battery to be rescued 4 is electrically conducted, the bridge member 46 is disconnected from the electric conductor 44 (as shown in FIG. 3). If the clamp 1 and the second clamp 2 are correctly connected to the positive pole and the negative pole of the battery to be rescued 4 (as shown in FIG. 5A), the alarm device 90 cannot obtain a sufficient driving voltage, which means that the power is correctly connected. The operable portion 43 and the reciprocating assembly 41 can be respectively pressed to be electrically connected the bridge member 46 and the electric conductor 44 (as shown in FIG. 4 and FIG. 5B). After that, the bridge member 46 is kept electrically connected with the electric conductor 44 by engaging the first engaging portion 471 of the pivoting member 47 with the elastic second engaging portion 421 of the engaging element 42, so as to continuously supply power to the battery to be rescued 4. If the clamp 1 and the second clamp 2 are, incorrectly, respectively electrically connected to the negative and positive poles of the battery to be rescued 4 (as shown in FIG. 5C), the rescue battery 3 and the battery to be rescued 4 are electrically connected in series, so as to provide sufficient voltage to drive the alarm device 90 to provide an indicative alarm for reminding the user of wrong connections of the connection of the clamp 1 and the second clamp 2. Preferably, the voltage required for driving the alarm device 90 is generally from 3V to 30V, but the voltage required for the alarm device 90 may be different according to various ones of the audible alarm and the optical alarm.

Figure 6:
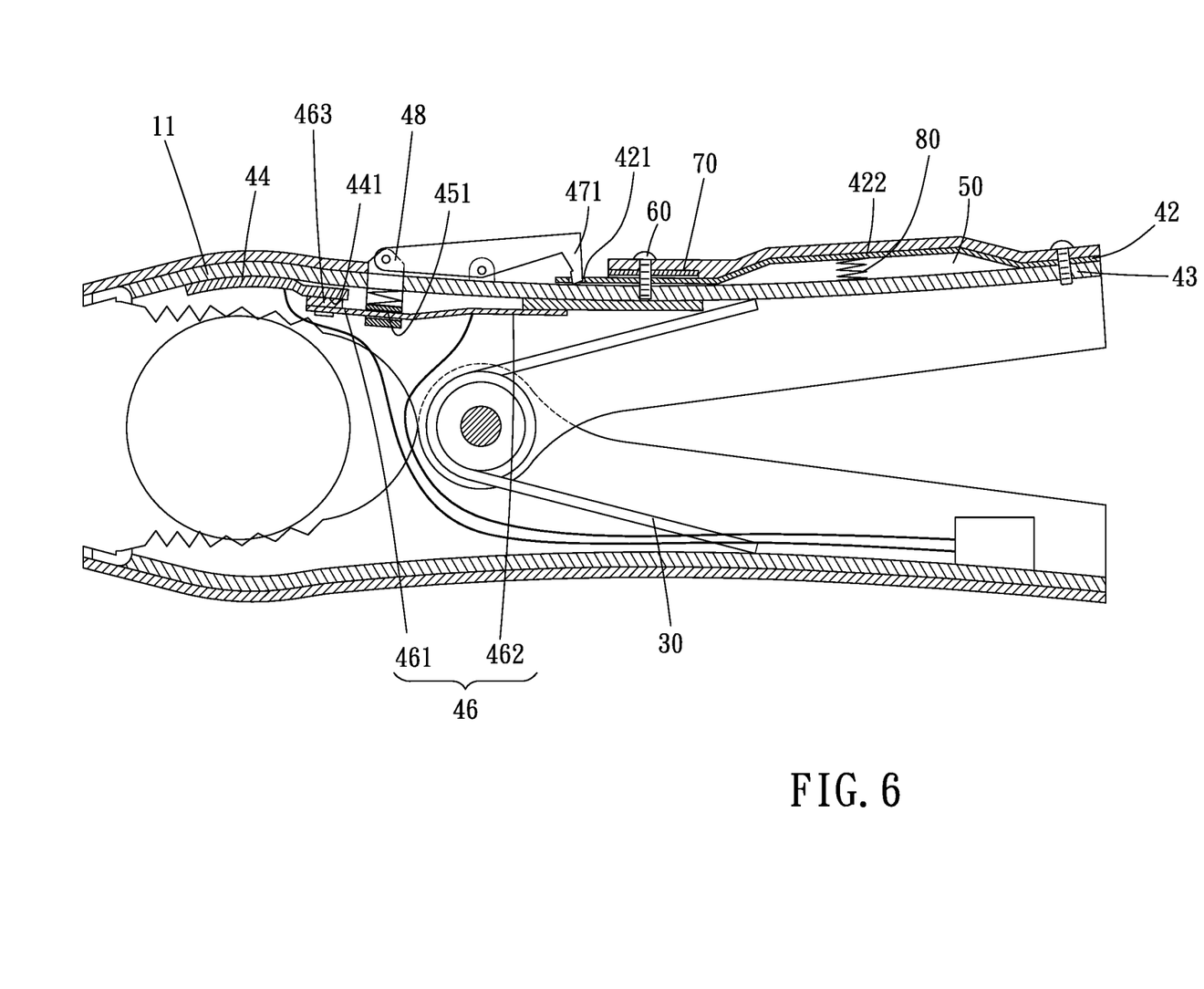
FIG. 6 is a cross-sectional drawing of a second preferable embodiment of the present invention.

Please refer to FIG. 6 for a second preferred embodiment. In the second preferred embodiment, the movable member 45 has a through hole 451, one end of the bridge member 46 is movably disposed through the through hole 451 and corresponds to the first jaw 11, so as to limit a travel distance of the bridge member 46 moving away from the first jaw 11.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A clamp, including:
   a first clamp body, having a first jaw which is electrically conductive;
   a second clamp body, pivoted with the first clamp body and having a second jaw being pivotable relative to the first jaw;
   a first elastic member, two ends of the first elastic member abutted respectively against the first clamp body and the second clamp body so that the first jaw of the first clamp body and the second jaw of the second clamp body are biased toward each other; and
   a conductive bridge mechanism, configured to be electrically connected with an electrode, including a reciprocating assembly, an elastic engaging element and an operable portion, the elastic engaging element disposed between the reciprocating assembly and the operable portion, the elastic engaging element and the reciprocating assembly being individually separate members, the elastic engaging element being movable toward the reciprocating assembly, the reciprocating assembly being movable toward the elastic engaging element and being positionally engaged with the elastic engaging element through an elastic reverse movement of the elastic engaging element, the reciprocating assembly having a first end corresponding to the first jaw and a second end corresponding to the elastic engaging element, the reciprocating assembly being movable between a first position and a second position, the elastic engaging element being movable between a third position and a fourth position, the operable portion being movable between a fifth position and a sixth position;
   wherein when the operable portion is located in the fifth position and the elastic engaging element is located in the third position, the reciprocating assembly is blocked by the elastic engaging element and located in the second position, and the electrode is electrically connected via the reciprocating assembly; when the elastic engaging element is located in the fourth position, the reciprocating assembly is not blocked by the elastic engaging element and biased to the first position, and the first jaw and the electrode are not electrically connected.

2. The clamp of claim 1, wherein the reciprocating assembly includes a movable member disposed through the first clamp body, a bridge member, a pivoting member pivoted with the first clamp body and pivoted with the movable member at one end, and a second elastic member disposed between the bridge member and the first clamp body, the bridge member is movably disposed through the movable member and one end of the bridge member corresponds to the first jaw; wherein when the operable portion is located in the fifth position and the elastic engaging element is located in the third position, another end of the pivoting member is blocked by the elastic engaging element so that the reciprocating assembly is located in the second position, and the bridge member is electrically connected with the first jaw; when the operable portion is located in the sixth position, the second elastic member biases the bridge member to move away from the first jaw to drive the another end of the pivoting member away from the elastic engaging element so that the pivoting member is not blocked by the elastic engaging element and so that bridge member is electrically disconnected from the first jaw.

3. The clamp of claim 2, wherein the pivoting member has a first engaging portion extending toward the elastic engaging element, the elastic engaging element has a second engaging portion extending toward the pivoting member, one of the first engaging portion and the second engaging portion has at least one male engaging structure, and the other of the first engaging portion and the second engaging portion has at least one female engaging structure engageable with the at least one male engaging structure.

4. The clamp of claim 3, wherein the elastic engaging element has an elastic pressing section, the second engaging portion is connected with the elastic pressing section, and when the elastic pressing section is pressed, the second engaging portion is movable between the third position and the fourth position.

5. The clamp of claim 4, further including an n-shaped member, the n-shaped member assembled to the first clamp body and having two restricting legs respectively arranged on opposite two sides of the elastic engaging element, the third position and the fourth position being located in a connection direction, two limiting legs arranged transversely to the connection direction; wherein the movable member has at least one ear portion, the at least one ear portion is pivoted with the pivoting member; the elastic engaging element has a first elongated hole, the first elongated hole extends toward the connection direction, the first elongated hole and the first clamp body are disposed through a retaining rod, the elastic engaging element is blocked by the retaining rod so that only can be movable between the third position and the fourth position; the n-shaped member has a second elongated hole which transversely extends to the first elongated hole, the retaining rod is disposed through the second elongated hole; a third elastic member is disposed between the operable portion and the elastic engaging element, the third elastic member biases the operable portion to move toward the fifth position; the bridge member is configured to be electrically connected with the electrode, the first clamp body includes a main body and an electric conductor which is configured to be electrically connected with the electrode, the main body has the first jaw, the electric conductor is disposed on the first jaw and electrically insulated from the first jaw, and the bridge member is electrically connectable with the electric conductor via the reciprocating assembly; the electric conductor has a first electric contact surface, the bridge member has a second electric contact surface facing the first electric contact surface, and when the operable portion is located in the fifth position and the elastic engaging element is located in the third position, the second electric contact surface electrically contacts with the first electric contact surface; the movable member has a through hole; the bridge member includes a first abutting section and a second abutting section, the first abutting section and the second abutting section are angularly arranged, the second abutting section abuts against and is electrically insulated from the first clamp body, and the first abutting section is disposed through the movable member and electrically contactable with the electric conductor via the reciprocating assembly; one end of the elastic engaging element is disposed parallelly on the first clamp body; the conductive bridge mechanism includes a conductive wire, the conductive wire has two opposite ends which are respectively electrically connected with two opposite ends of the bridge member, when current flows through the conductive wire and the bridge member, a current density of the conductive wire is greater than a current density of the bridge member; the conductive wire is woven by a plurality of metal thin wires; the bridge member is coated with an electrical insulating layer, when the bridge member is disposed through the movable member, and the electrical insulating layer is disposed between the bridge member and movable member.

6. The clamp of claim 2, wherein the conductive bridge mechanism includes a conductive wire, the conductive wire has two opposite ends which are respectively electrically connected with two opposite ends of the bridge member, and when current flows through the conductive wire and the bridge member, a current density of the conductive wire is greater than a current density of the bridge member.

7. The clamp of claim 2, wherein the bridge member is configured to be electrically connected with the electrode, the first clamp body includes a main body and an electric conductor which is configured to be electrically connected with the electrode, the main body has the first jaw, the electric conductor is disposed on the first jaw and electrically insulated from the first jaw, and the bridge member is electrically connectable with the electric conductor via the reciprocating assembly.

8. The clamp of claim 7, wherein a third elastic member is disposed between the operable portion and the elastic engaging element, the third elastic member biases the operable portion to move toward the fifth position, the electric conductor has a first electric contact surface, the bridge member has a second electric contact surface facing the first electric contact surface, and when the operable portion is located in the fifth position and the elastic engaging element is located in the third position, the second electric contact surface electrically contacts the first electric contact surface.

9. The clamp of claim 7, wherein the bridge member includes a first abutting section and a second abutting section, the first abutting section and the second abutting section are angularly arranged, the second abutting section abuts against and is electrically insulated from the first clamp body, and the first abutting section is disposed through the movable member and electrically contactable with the electric conductor via the reciprocating assembly.

10. The clamp of claim 1, further including an n-shaped member, the n-shaped member assembled to the first clamp body and having two restricting legs respectively arranged on opposite two sides of the elastic engaging element, the third position and the fourth position being in a connection direction, and two limiting legs arranged transversely to the connection direction.

* * * * *